United States Patent
Ogino et al.

(10) Patent No.: US 11,010,039 B2
(45) Date of Patent: May 18, 2021

(54) DISPLAY CONTROL APPARATUS AND NON-TRANSITORY COMPUTER READABLE MEDIUM

(71) Applicant: FUJI XEROX CO., LTD., Tokyo (JP)

(72) Inventors: Takashi Ogino, Kanagawa (JP); Tomoyuki Ito, Kanagawa (JP); Michiaki Yasuno, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/113,191

(22) Filed: Aug. 27, 2018

(65) Prior Publication Data

US 2019/0302996 A1 Oct. 3, 2019

(30) Foreign Application Priority Data

Apr. 3, 2018 (JP) .............................. JP2018-071509

(51) Int. Cl.
*G06F 17/00* (2019.01)
*G06F 3/048* (2013.01)
*G06F 3/0485* (2013.01)
*G06F 3/0484* (2013.01)
*G06F 40/177* (2020.01)

(52) U.S. Cl.
CPC ...... *G06F 3/04855* (2013.01); *G06F 3/04842* (2013.01); *G06F 40/177* (2020.01)

(58) Field of Classification Search
CPC .... G06F 16/26; G06F 17/245; G06F 3/04855; G06F 40/177; G06F 3/04842; G06F 3/04895
USPC ........................................ 715/277, 200, 784
See application file for complete search history.

(56) References Cited

U.S. PATENT DOCUMENTS

| 8,645,853 B2* | 2/2014 | Prinsen | G06F 3/0486 715/769 |
| 2009/0006319 A1* | 1/2009 | Lehtipalo | G06F 16/26 |
| 2010/0312747 A1* | 12/2010 | Stolte | G06F 16/211 707/602 |
| 2014/0136939 A1* | 5/2014 | Chan | G06F 40/18 715/227 |
| 2020/0057795 A1* | 2/2020 | Audet | G06F 16/904 |

* cited by examiner

FOREIGN PATENT DOCUMENTS

JP 2002-149300 A 5/2002

OTHER PUBLICATIONS

Excel, Excel 2016 Screenshot, 2016, Microsoft, pp. 1-2 (pdf).*

*Primary Examiner* — Manglesh M Patel
(74) *Attorney, Agent, or Firm* — Oliff PLC

(57) ABSTRACT

A display control apparatus includes a control unit. In the case where, with a display unit displaying a multi-dimensional table that includes three or more axes which extend in different directions and on each of which plural items are disposed and plural tables each including plural cells that indicate a correlation between items disposed on two orthogonal axes of the three or more axes, a scroll operation is performed on a first table selected from the plural tables, a second table is adjacent to the first table in a first direction determined in advance, and the direction of the scroll operation is a second direction that is orthogonal to the first direction, the control unit performs control such that the first table and the second table are scrolled in conjunction with each other together with an axis that extends along the direction of the scroll operation.

17 Claims, 12 Drawing Sheets

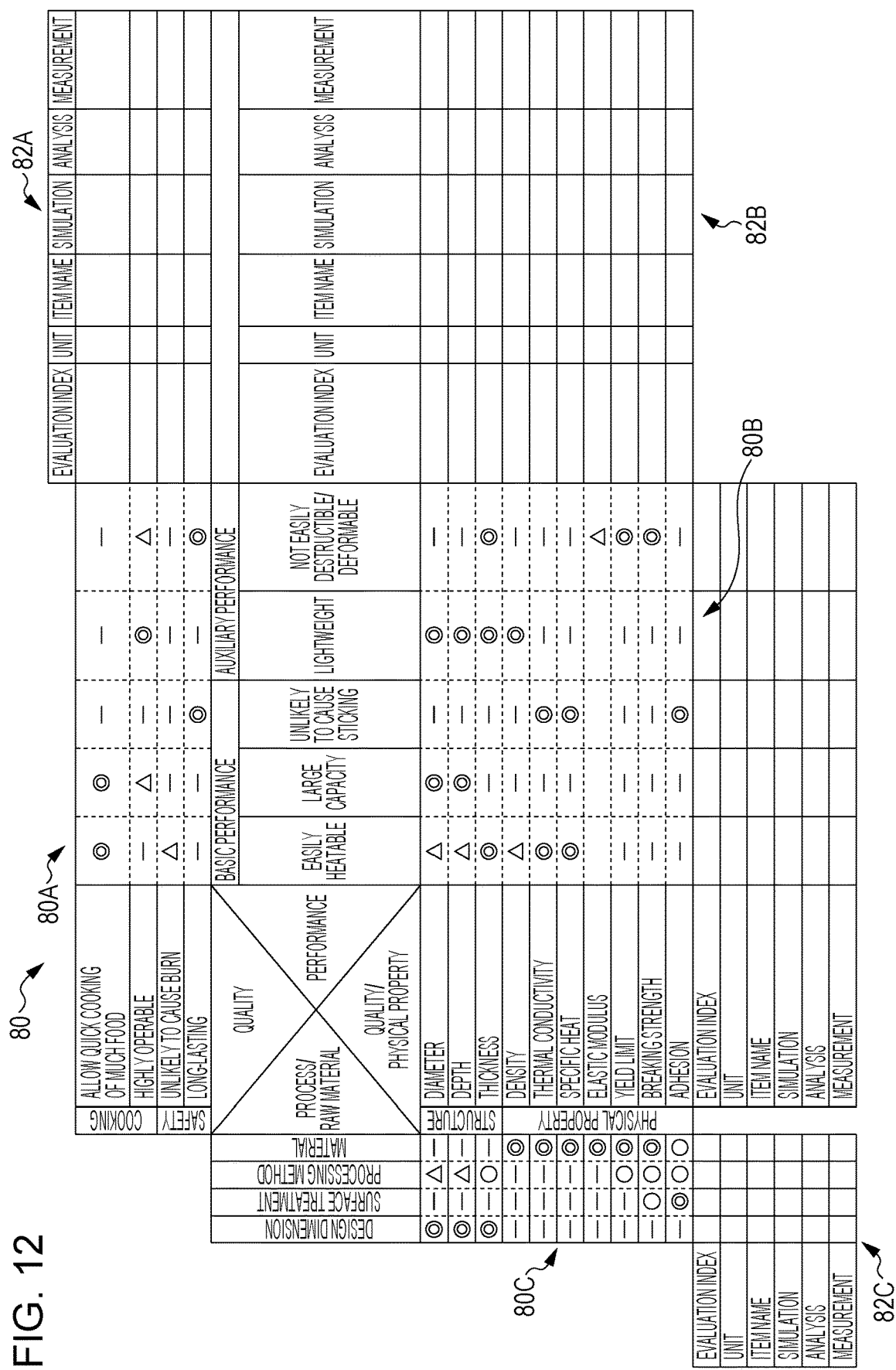

DISPLAY CONTROL APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-071509 filed Apr. 3, 2018.

BACKGROUND

Technical Field

The present invention relates to a display control apparatus and a non-transitory computer readable medium.

SUMMARY

According to an aspect of the present invention, there is provided a display control apparatus including a control unit that performs control such that, in a case where, with a display unit displaying a multi-dimensional table that includes three or more axes which extend in different directions and on each of which plural items are disposed and plural tables each including plural cells that indicate a correlation between items disposed on two orthogonal axes of the three or more axes, a scroll operation is performed on a first table selected from the plural tables, a second table is adjacent to the first table in a first direction determined in advance, and a direction of the scroll operation is a second direction that is orthogonal to the first direction, the first table and the second table are scrolled in conjunction with each other together with an axis that extends along the direction of the scroll operation.

BRIEF DESCRIPTION OF THE DRAWINGS

An exemplary embodiment of the present invention will be described in detail based on the following figures, wherein:

FIG. 12 illustrates a specific example of the QA table.

DETAILED DESCRIPTION

An exemplary embodiment of the present invention will be described in detail below with reference to the drawings.

In the present exemplary embodiment, a mode of controlling display of a multi-dimensional table such as a quality assurance (QA) table in quality function deployment (QFD), for example, is described.

Figure 1:
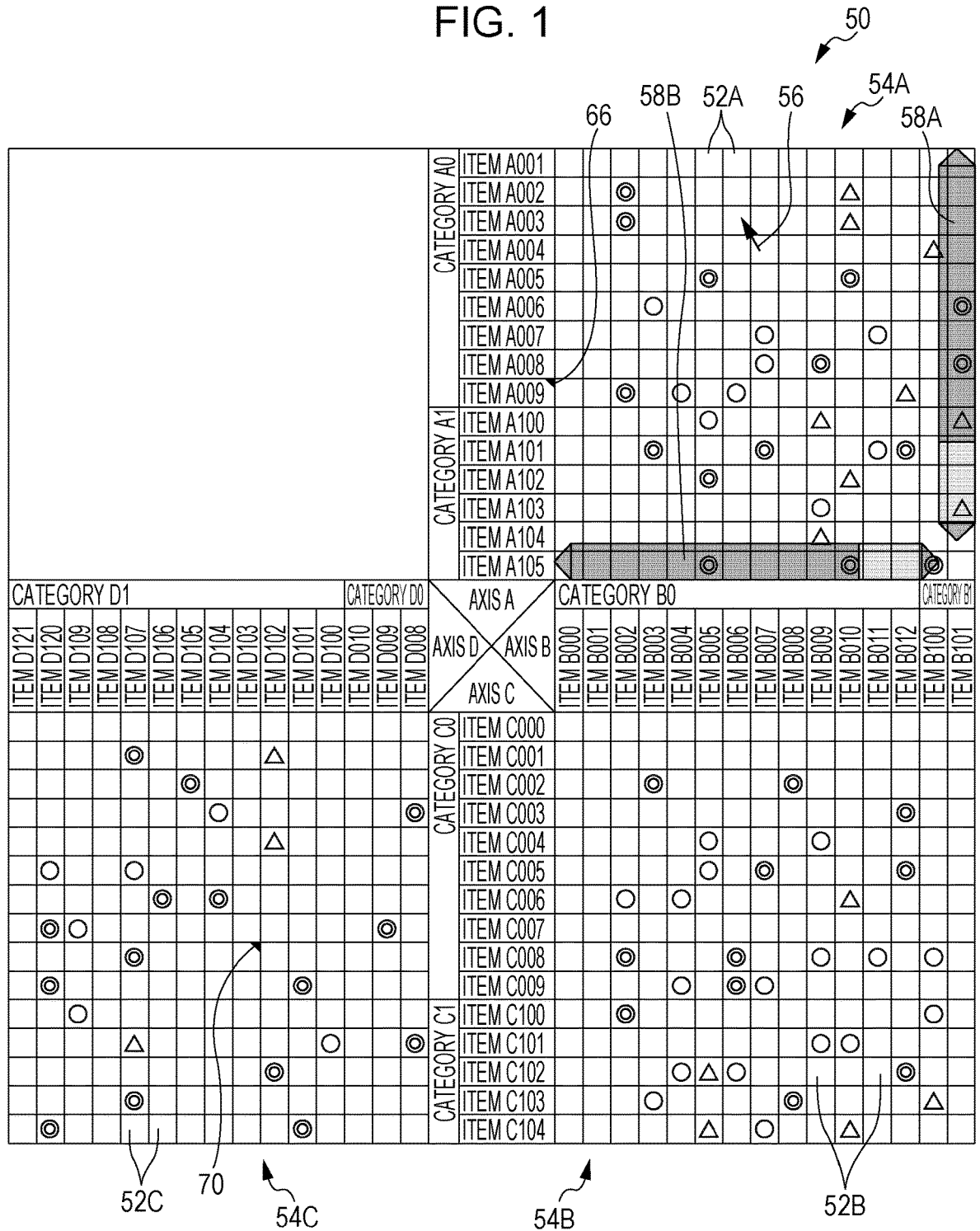
FIG. 1 illustrates an example of a QA table.

Examples of the QA table in the quality function deployment include a QA table 50 such as that illustrated in FIG. 1, for example. As illustrated in FIG. 1, the QA table 50 as an example of the multi-dimensional table includes four axes A to D which extend in different directions and on each of which plural items are disposed, and three tables 54A to 54C each including plural cells 52A to 52C, respectively, that indicate the correlation between items disposed on two orthogonal axes of the four axes A to D.

The table 54A includes plural cells 52A that indicate the correlation between items A001, A002, . . . disposed on the axis A and items B000, B001, . . . disposed on the axis B. In the following description, the items A001, A002, . . . will be referred to simply as items A in the case where the items are not differentiated from each other. Meanwhile, the items B000, B001, . . . will be referred to simply as items B in the case where the items are not differentiated from each other.

In the example in FIG. 1, the cells 52A indicate the correlation between the items A disposed on the axis A and the items B disposed on the axis B using four identifiers, namely, a "double circle" indicating VERY STRONG, a "circle" indicating STRONG, a "triangle" indicating WEAK, and a "blank field" indicating NONE. Such identifiers indicate the magnitude of the correlation (causal relationship).

The table 54B includes plural cells 52B that indicate the correlation between items B001, B002, . . . disposed on the axis B and items C000, C001, . . . disposed on the axis C. In the following description, the items C000, C001, . . . will be referred to simply as items C in the case where the items are not differentiated from each other.

As illustrated in FIG. 1, as with the cells 52A, the cells 52B indicate the correlation between the items disposed on the axis B and the items disposed on the axis C using four identifiers, namely, a "double circle", a "circle", a "triangle", and a "blank field".

The table 54C includes plural cells 52C that indicate the correlation between items C001, C002, . . . disposed on the axis C and items D000, D001, . . . disposed on the axis D. In the following description, the items D000, D001, . . . will be referred to simply as items D in the case where the items are not differentiated from each other.

As illustrated in FIG. 1, as with the cells 52A, the cells 52C indicate the correlation between the items disposed on the axis C and the items disposed on the axis D using four identifiers, namely, a "double circle", a "circle", a "triangle", and a "blank field".

As illustrated in FIG. 1, the items A001 to A009 are categorized into a category A0, and the items A100, A101, . . . are categorized into a category A1. In this manner, the items are categorized such that plural items belong to each category in accordance with the type of the items, for example. Also for the axes B, C, and D, the items disposed on each of the axes are categorized such that plural items belong to each category in accordance with the type of the items, for example.

The QA table 50 is used in the case where it is desired to know the causal relationship among four factors including the quality, the performance, the managed physical quantity, and the setting item of a developed system, for example. In this case, items related to the "quality" are set on the axis A, items related to the "performance" are set on the axis B, items related to the "managed physical quantity" are set on the axis C, and items related to the "setting item" are set on the axis D.

The "quality" is an index of a customer value, for example, and is specifically an evaluation index of a value (degree of satisfaction) guaranteed to a customer (next process). The "performance" is an index of the degree of expression of a function, and is specifically an index of the degree of expression of a peculiar role (function) that the component or subsystem plays so that the entire system achieves the quality. The "managed physical quantity" is a physical quantity to be managed, and is specifically a physical quantity to be managed and prescribed so that the component or subsystem demonstrates the performance. The "setting item" is a quantity or a condition directly determined by a designer, and is specifically a setting condition for controlling a managed physical quantity of the target component or subsystem, and a quantity or a condition that is (or should be) determined by a designer or developer determines.

In this case, the correlation, that is, the causal relationship, between the items A related to the "quality", which are set on the axis A, and the items B related to the "performance", which are set on the axis B, is grasped by referencing the table 54A. The correlation between the items B related to the "performance", which are set on the axis B, and the items C related to the "managed physical quantity", which are set on the axis C, is grasped by referencing the table 54B. The correlation between the items C related to the "managed physical quantity", which are set on the axis C, and the items D related to the "setting item", which are set on the axis D, is grasped by referencing the table 54C. Thus, the "setting item" corresponding to the "quality" is grasped by referencing the tables clockwise. Setting the quality, the performance, the managed physical quantity, and the setting item to the four axes as described herein is merely exemplary, and desired items that have causal relationship between a factor and an element may be set to the axes.

Figure 2:
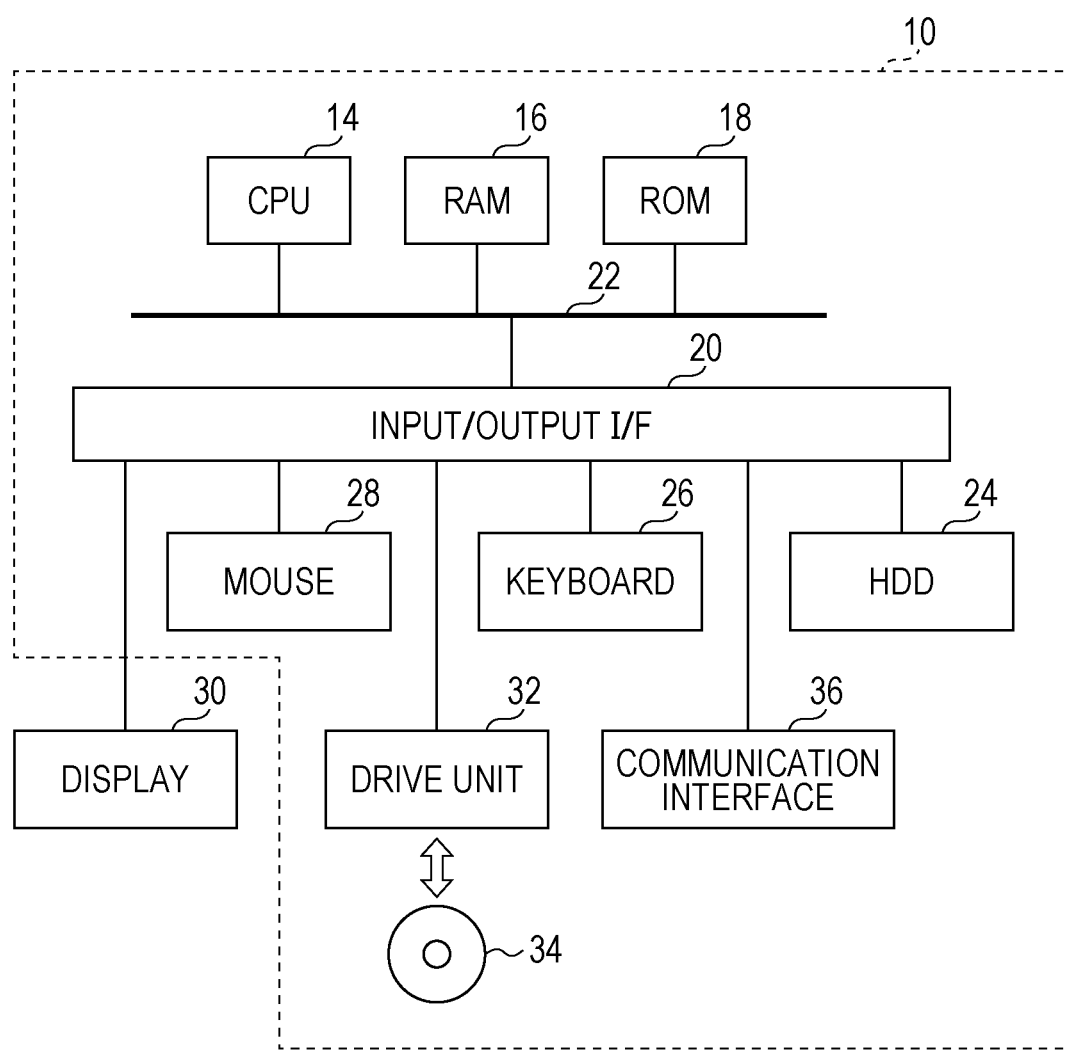
FIG. 2 is a block diagram illustrating the configuration of a display control apparatus.

FIG. 2 illustrates the configuration of a display control apparatus 10 that controls display of the QA table 50 such as that illustrated in FIG. 1.

The display control apparatus 10 includes a central processing unit (CPU) 14, a random access memory (RAM) 16, a read only memory (ROM) 18, an input/output interface (I/F) 20, and so forth.

The display control apparatus 10 includes a bus 22 such as a peripheral component interconnect (PCI) bus 22. The CPU 14, the RAM 16, the ROM 18, and the input/output I/F 20 are connected to the bus 22.

The display control apparatus 10 also includes a nonvolatile memory with a large capacity such as a hard disk drive (HDD) (hereinafter referred to as an HDD 24 by way of example), a keyboard 26 that is used to input data or the like, a mouse 28 that serves as a pointing device, and so forth. The HDD 24, the keyboard 26, and the mouse 28 are connected to the input/output I/F 22.

A display 30 that is used to display various information and to also display a user interface (UI) or the like that is used to input and output data or the like is also connected to the input/output I/F 22.

The HDD 24 stores a display control process program to be discussed later and QA table data for displaying the QA table 50. The CPU 14 reads and executes the display control program stored in the HDD 24, for example. The QA table data include data that indicate the items and categories set to the axes A to D, data that indicate the correlation between the items, and so forth.

The display control apparatus 10 includes a drive unit 32 that supports any portable storage medium such as a memory card that uses a flash memory or the like, an optical disk such as a CD, a DVD, and a Blu-ray (registered trademark) disc (BD), and a magneto-optical disk such as an MD and an MO. The drive unit 32 is connected to the input/output I/F 20 so that a display control program or the like stored in a portable storage medium 34 mounted to the drive unit 32 is stored (installed) in the HDD 24, for example. In the case where various data such as data that indicate the process results of a process executed by the CPU 14 are to be output, the display control apparatus 10 may write such data into the portable storage medium 34 which is mounted to the drive unit 32.

The display control apparatus 10 also includes a communication interface 36 connected to a dedicated network, a public network, or the like to perform various types of communication. The communication interface 36 is connected to the input/output I/F 20. The display control apparatus 10 may acquire a display control program via the communication interface 36, and store the acquired display control program in the HDD 24. The display control apparatus 10 may also output data such as data that indicate the process results of a process executed by the CPU 14 to another device via the communication interface 36.

Next, a display control process executed by the CPU 14 will be described as the effect of the exemplary embodiment.

Figure 3:
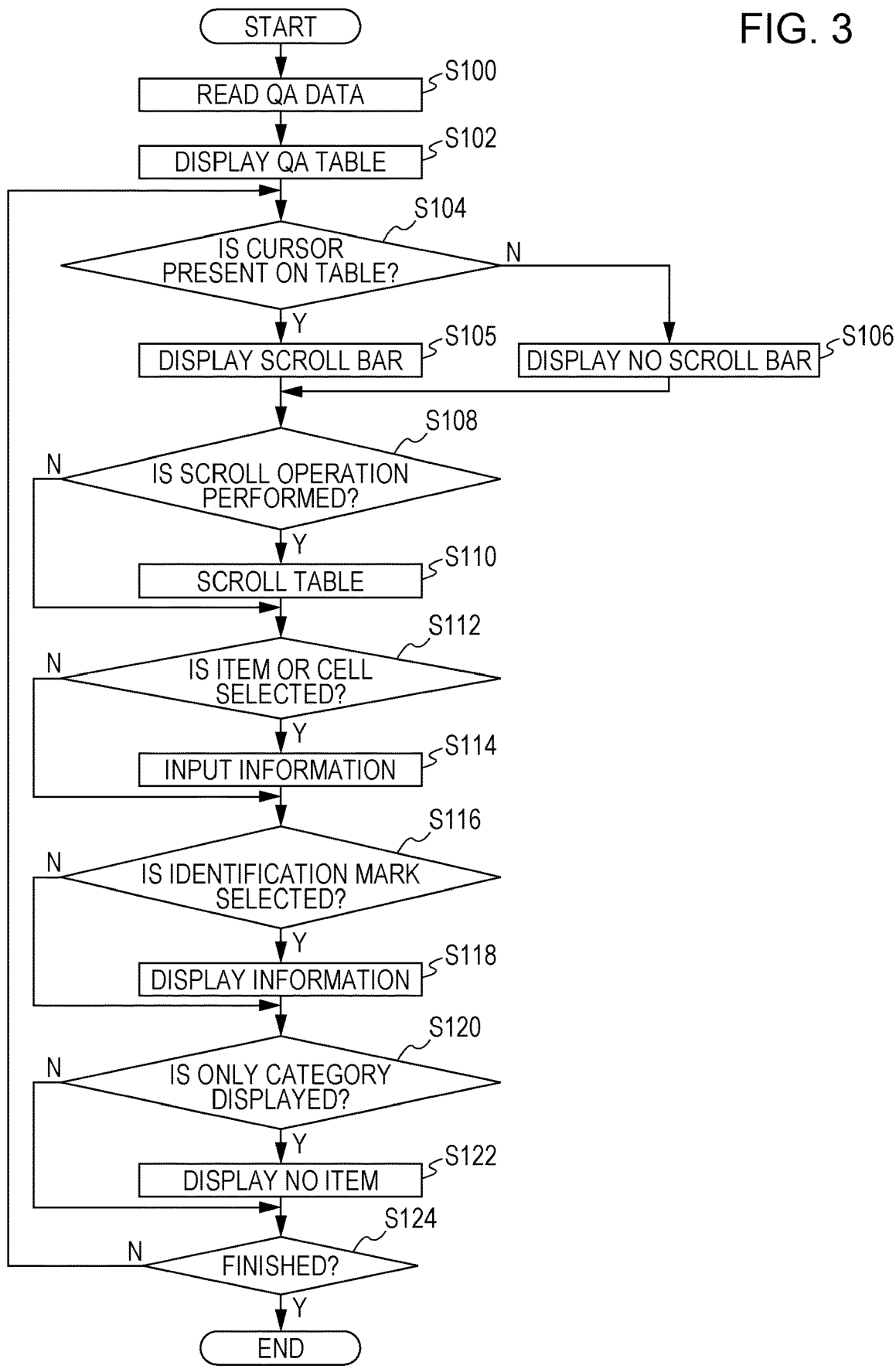
FIG. 3 is a flowchart illustrating an example of the flow of a process of a display control program.

FIG. 3 is a flowchart illustrating the flow of a process of a display control program. The display control program is installed in the HDD 24 in advance. When display of the QA table 50 is instructed by a user, the CPU 14 reads from the HDD 24 and executes the display control program.

In step S100, QA table data are read from the HDD 24 into the RAM 16.

In step S102, a QA table 50 is generated on the basis of the QA table data read in step S100, and displayed on the display 30. Consequently, the QA table 50 such as that illustrated in FIG. 1 is displayed on the display 30.

In step S104, it is determined whether or not a cursor that is movable on the screen through an operation of the mouse 28 is present on any of the tables 54A to 54C. In the case where the cursor is present on any of the tables 54A to 54C, the process proceeds to step S105. In the case where the cursor is not present on any of the tables 54A to 54C, the process proceeds to step S106.

In step S105, scroll bars are displayed on axes corresponding to the table on which the cursor is present. For example, in the case where a cursor 56 is present on the table 54A as illustrated in FIG. 1, a scroll bar 58A that extends in a direction along the axis A (hereinafter referred to as "A direction") is displayed, and a scroll bar 58B that extends in a direction along the axis B (hereinafter referred to as "B direction") is displayed.

In step S106, control is performed such that a scroll bar is not displayed in the case where the cursor 56 is not present on any of the tables 54A to 54C.

In step S108, it is determined whether or not a scroll operation is performed by the user. In the case where a scroll operation is performed, the process proceeds to step S110. In the case where a scroll operation is not performed, the process proceeds to step S112. In the case where the user operates the scroll bar 58A or the scroll bar 58B in the state in FIG. 1, for example, the process proceeds to step S110.

In step S110, the table corresponding to the scroll bar on which the scroll operation is performed is scrolled. For example, in the case where the scroll operation is performed on the scroll bar 58A in the A direction, which is an example of a first direction, in the case where the table 54A is selected with the cursor 56 located on the table 54A, which is an example of a first table, as in FIG. 1, control is performed such that the table 54A is independently scrolled together with the A axis which extends along the direction of the scroll operation. That is, the items and the categories on the A axis and the cells 52A which constitute the table 54A are scrolled in the A direction. In this case, the tables 54B and 54C and the axes B, C, and D are not scrolled. The A axis is an example of the first axis, and the A direction is an example of the first axial direction.

In the case where the scroll bar 58B is operated in the B direction, which is an example of a second direction, which is orthogonal to the A direction, meanwhile, control is performed such that the table 54A and the table 54B, which is an example of a second table, which is adjacent to the table 54A in the A direction are scrolled in conjunction with each other together with the B axis which extends along the direction of the scroll operation. That is, the items and the categories on the B axis and the cells 52B which constitute the table 54B and the cells 52A which constitute the table 54A are scrolled in conjunction with each other in the B direction. In this case, the table 54C and the axes A, C, and D are not scrolled. The axes A to D are fixed in position, and are not movable.

Figure 4:
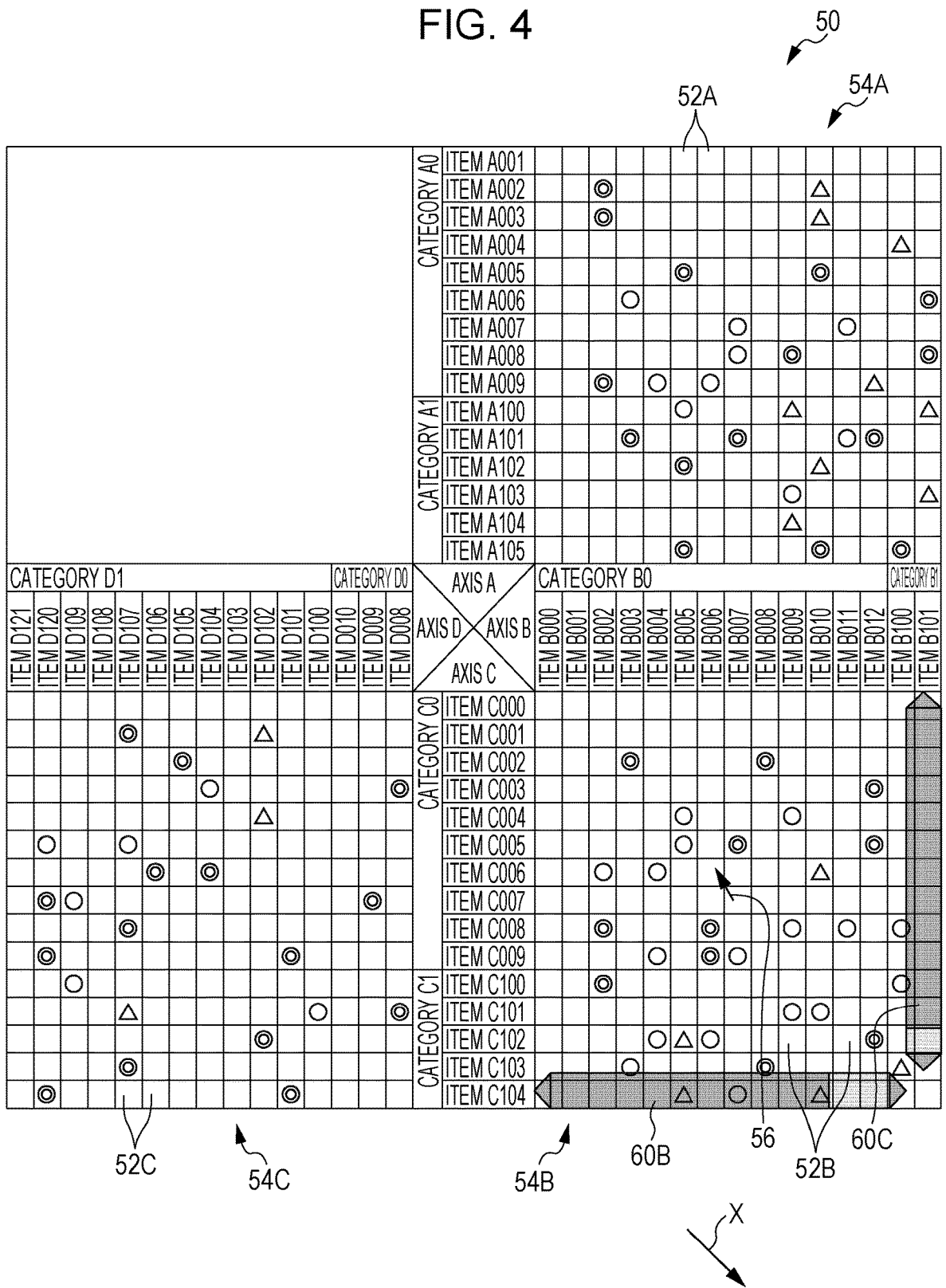
FIG. 4 illustrates an example of the QA table.

In the case where a scroll operation is performed in the B direction in the case where the table 54B is selected with the cursor 56 located on the table 54B and a scroll bar 60B which extends in a direction along the B axis is displayed and a scroll bar 60C which extends in a direction along the C axis is displayed as illustrated in FIG. 4, control is performed such that the table 54B and the table 54A are scrolled in conjunction with each other together with the B axis which extends along the direction of the scroll operation. That is, the items and the categories on the B axis and the cells 52B which constitute the table 54B are scrolled in the B direction, and the cells 52A which constitute the table 54A are scrolled in the B direction in conjunction therewith. In this case, the table 54C and the axes A, C, and D are not scrolled.

In the case where the scroll bar 60C is operated in a direction along the C axis (hereinafter referred to as "C direction") which is orthogonal to the B direction, meanwhile, control is performed such that the table 54B and the table 54C, which is adjacent to the table 54B in the B direction, are scrolled in conjunction with each other together with the C axis which extends along the direction of the scroll operation. That is, the items and the categories on the C axis and the cells 52B which constitute the table 54B and the cells 52C which constitute the table 54C are scrolled in conjunction with each other in the C direction. In this case, the table 54A and the axes A, B, and D are not scrolled.

Figure 5:
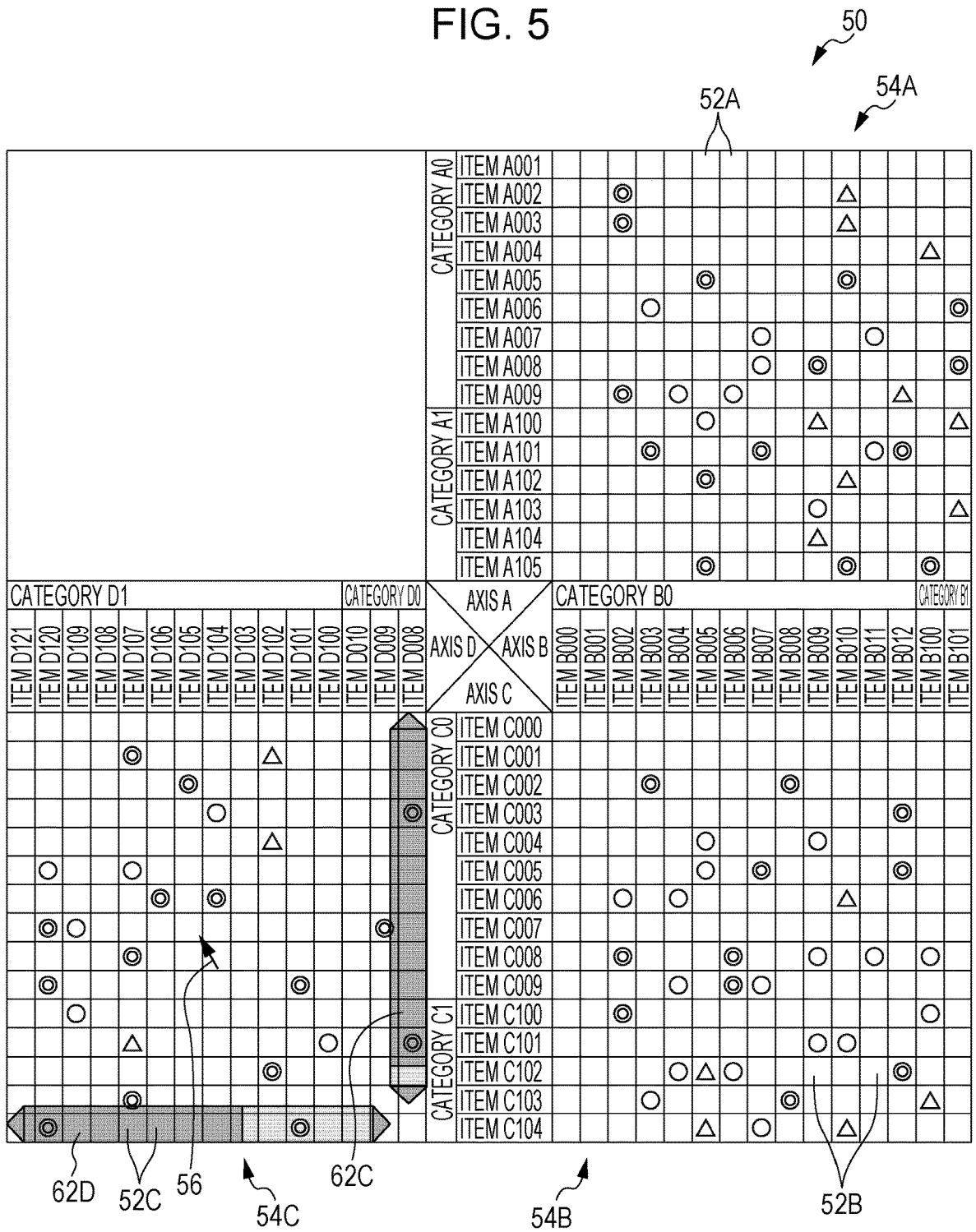
FIG. 5 illustrates an example of the QA table.

In the case where a scroll operation is performed in a direction along the D axis (hereinafter referred to as "D direction") in the case where the table 54C is selected with the cursor 56 located on the table 54C and a scroll bar 62C which extends in a direction along the C axis is displayed and a scroll bar 62D which extends in a direction along the D axis is displayed as illustrated in FIG. 5, control is performed such that the table 54C is independently scrolled together with the D axis which extends along the direction of the scroll operation. That is, the items and the categories on the D axis and the cells 52C which constitute the table 54C are scrolled in the D direction. In this case, the tables 54A and 54B and the axes A, B, and C are not scrolled.

In the case where the scroll bar 62C is operated in the C direction which is orthogonal to the D direction, meanwhile, control is performed such that the table 54B, which is adjacent to the table 54C with the C axis interposed therebetween, and the table 54C are scrolled in conjunction with each other in the C direction. That is, the items and the categories on the C axis and the cells 52C which constitute the table 54C and the cells 52B which constitute the table 54B are scrolled in conjunction with each other in the C direction. In this case, the table 54A and the axes A, B, and D are not scrolled.

In the case where a drag operation is performed in an oblique direction on a table, that is, in the case where the mouse 28 is moved in an oblique direction with a mouse button depressed, for example, control is performed such that a vertical axis and a horizontal axis corresponding to the table are scrolled at the same time.

For example, in the case where a scroll operation is performed in an oblique direction X that intersects the B direction and the C direction in the state in FIG. 4, control is performed such that the table 54B is scrolled in the oblique direction X together with the B axis and the C axis.

Control may be performed such that, in the case where a scroll operation is performed in an oblique direction, the table 54A, which is adjacent to the table 54B with the B axis interposed therebetween, is scrolled in the B direction and the table 54C, which is adjacent to the table 54B with the C axis interposed therebetween, is scrolled in the C direction.

In step S112, it is determined whether or not an operation to select any of the items and the cells is performed. An operation to select any of the items and the cells includes an operation of double-clicking with the cursor 56 moved onto a desired cell, but is not limited thereto. In the case where any of the items and the cells is selected, the process proceeds to step S114. In the case where any of the items and the cells is not selected, the process proceeds to step S116.

Figure 6:
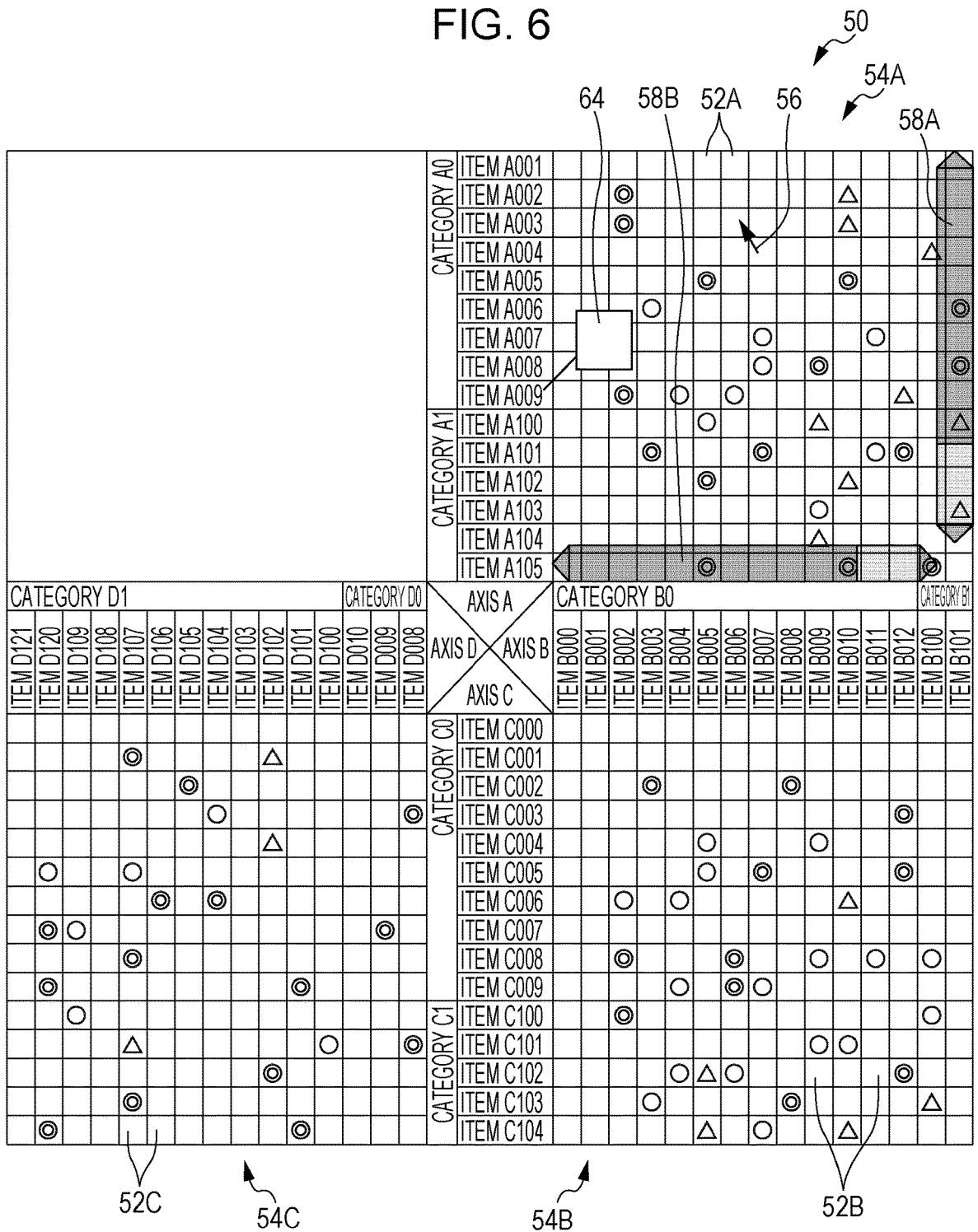
FIG. 6 illustrates an example of the QA table.

In step S114, in the case where an item is selected, a first input field that allows input of first information is displayed in the vicinity of the selected item. For example, in the case where the item A009 is selected by double-clicking with the mouse 28 or the like, a first input field 64 is displayed in the vicinity of the item A009 as illustrated in FIG. 6. The user inputs information related to the item A009 to the first input field 64. In the case where first information is input to the first input field 64, control is performed such that a first identification mark 66 indicating that the first information is input is displayed in the selected item A009 as illustrated in FIG. 1, for example. In the example in FIG. 1, the first identification mark 66 is a triangular mark. However, the present invention is not limited thereto.

Figure 7:
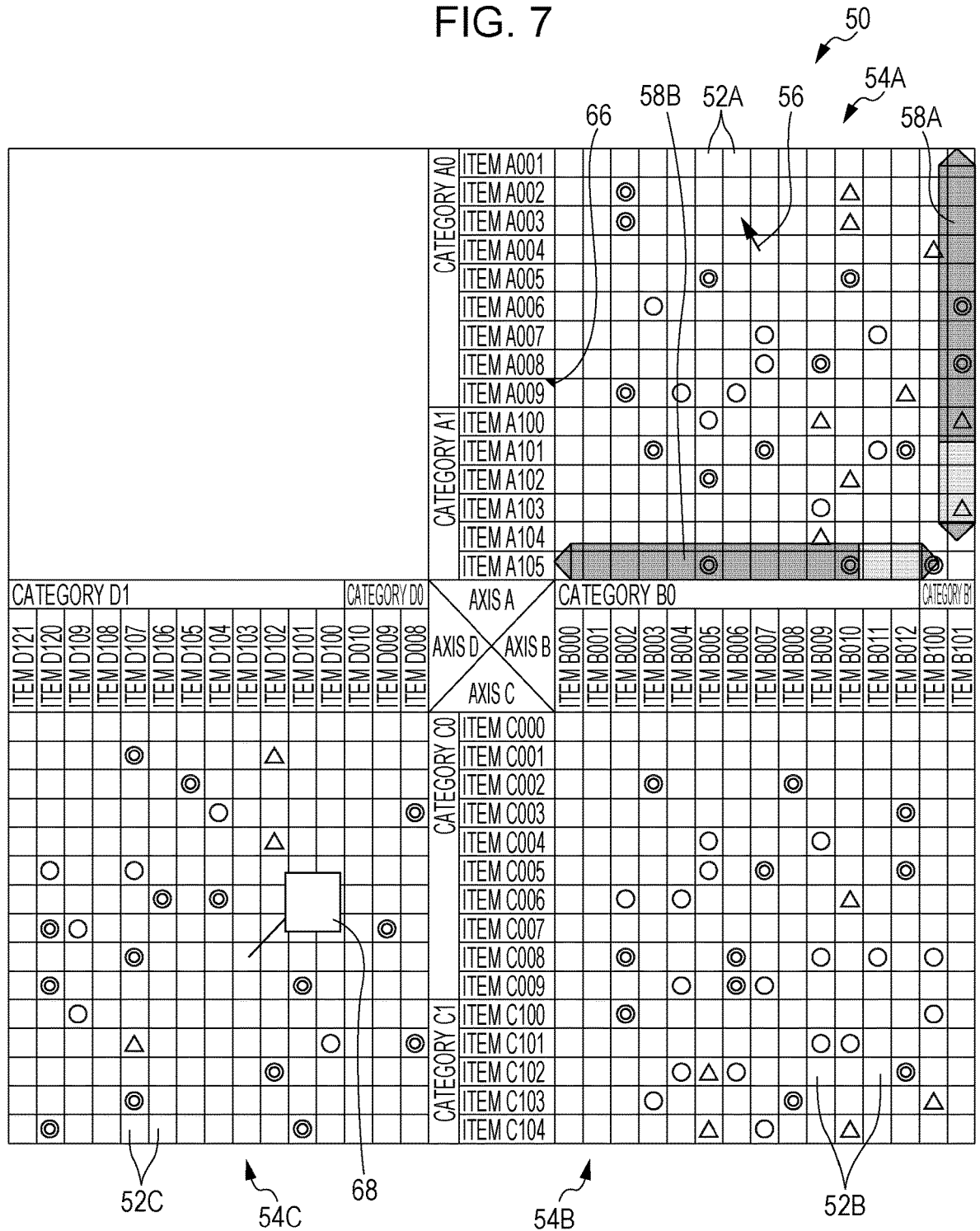
FIG. 7 illustrates an example of the QA table.

Similarly, in the case where a cell is selected, meanwhile, a second input field 68 that allows input of second information is displayed as illustrated in FIG. 7, for example. The user inputs information related to the selected cell to the second input field 68. In the case where second information is input to the second input field 68, control is performed such that a second identification mark 70 indicating that the second information is input is displayed in the selected cell as illustrated in FIG. 1, for example. The second identification mark 70 may be a triangular mark as with the first identification mark 66, or may have a different shape.

In step S116, it is determined whether or not any of the first identification mark and the second identification mark is selected. Examples of an operation to select an identification mark include clicking with the cursor 56 moved onto the identification mark or a cell in which the identification mark is displayed, and simply moving the cursor 56 onto the identification mark or the cell in which the identification mark is displayed.

In the case where any of the first identification mark and the second identification mark is selected, the process proceeds to step S118. In the case where any of the first identification mark and the second identification mark is not selected, the process proceeds to step S120.

Figure 8:
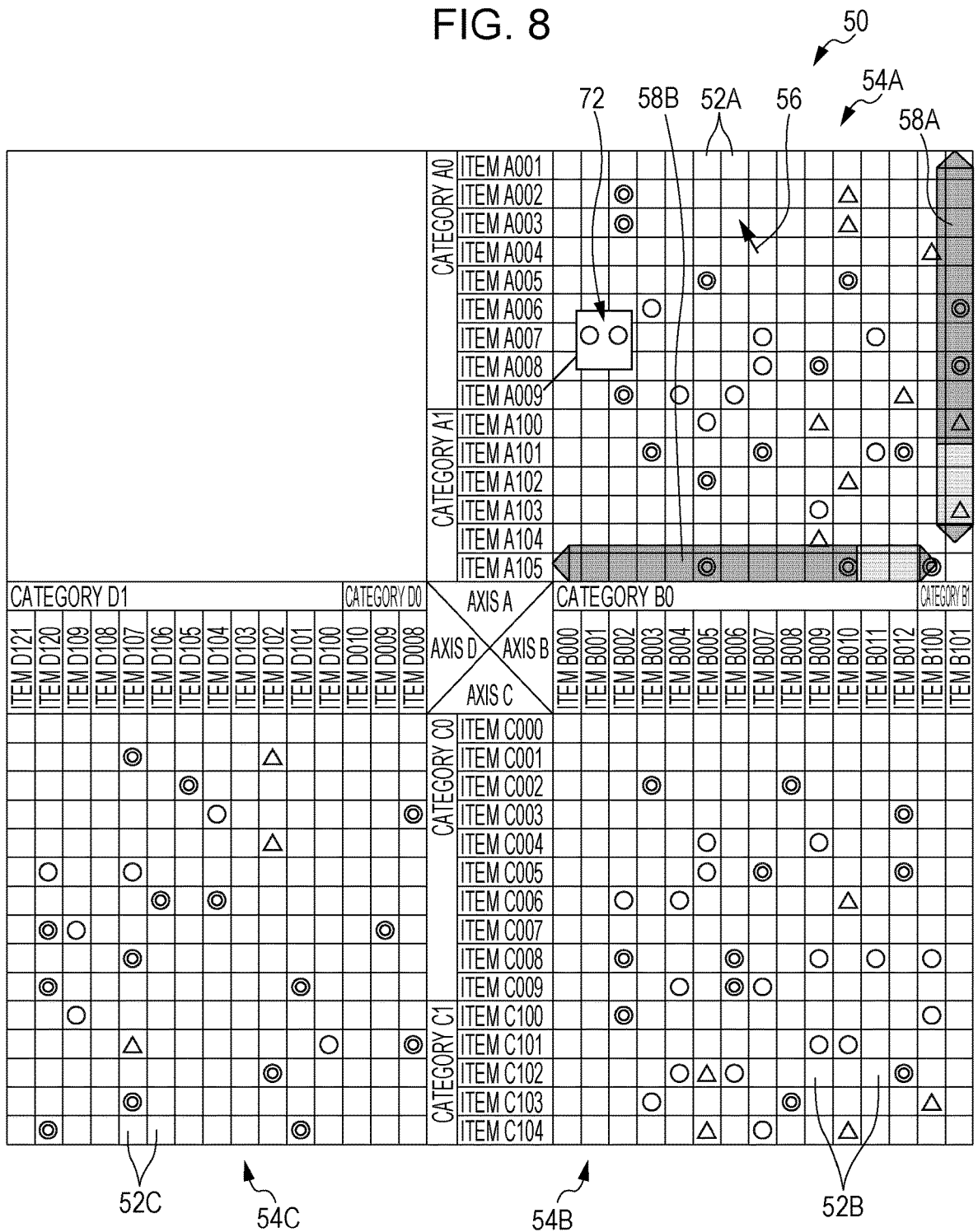
FIG. 8 illustrates an example of the QA table.
Figure 9:
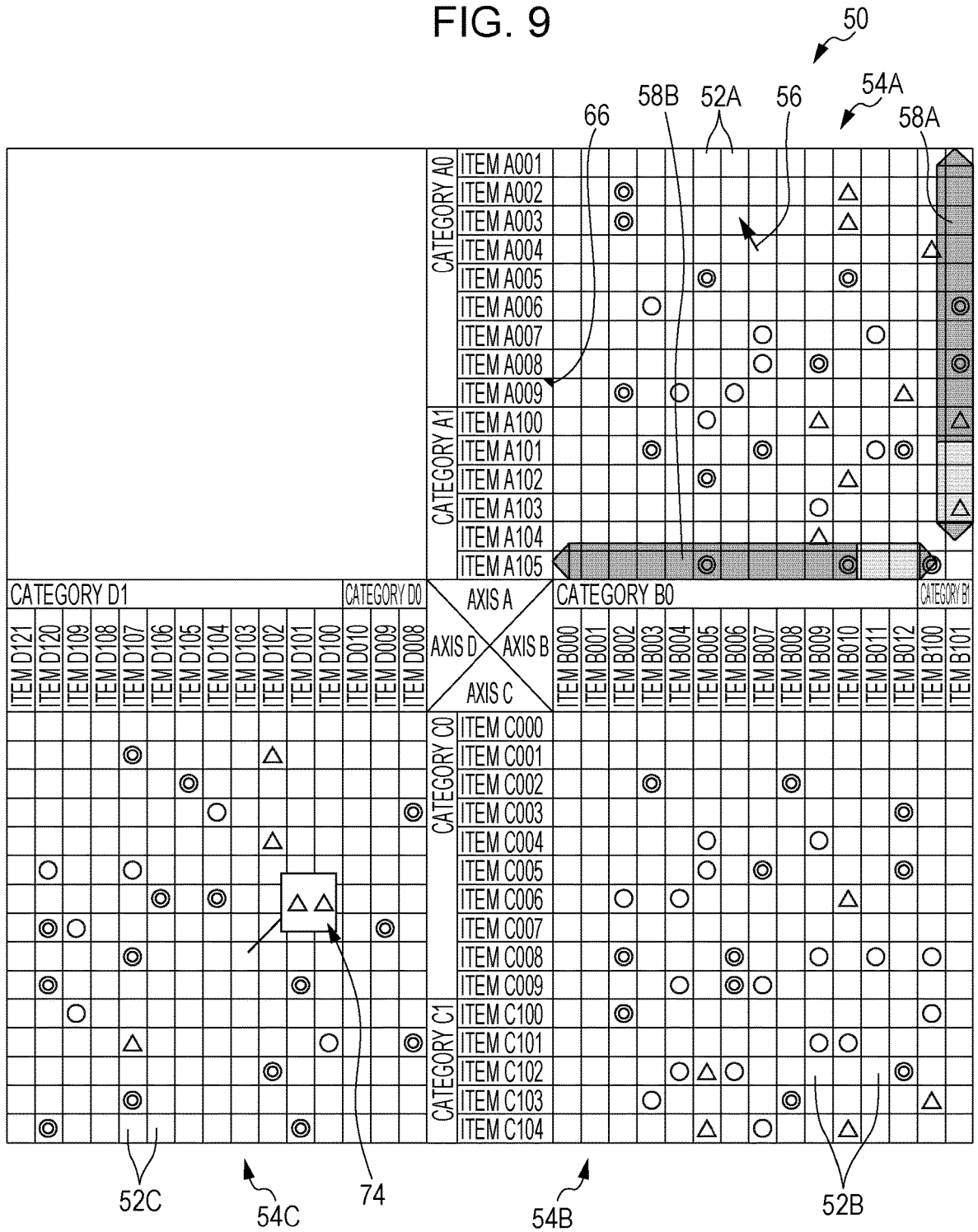
FIG. 9 illustrates an example of the QA table.

In step S118, information corresponding to the selected identification mark is displayed on the display 30. For example, in the case where the first identification mark 66 is selected, first information 72 is displayed in the vicinity of the selected first identification mark 66 as illustrated in FIG. 8. Similarly, in the case where the second identification mark 70 is selected, second information 74 is displayed in the vicinity of the selected second identification mark 70 as illustrated in FIG. 9.

In step S120, it is determined whether or not a predetermined operation to display only a category is performed. In the case where an operation to display only a category is performed, the process proceeds to step S122. In the case where an operation to display only a category is not performed, the process proceeds to step S124. A predetermined operation to display only a category includes an operation of double-clicking with the cursor 56 moved onto a desired category, but is not limited thereto.

Figure 10:
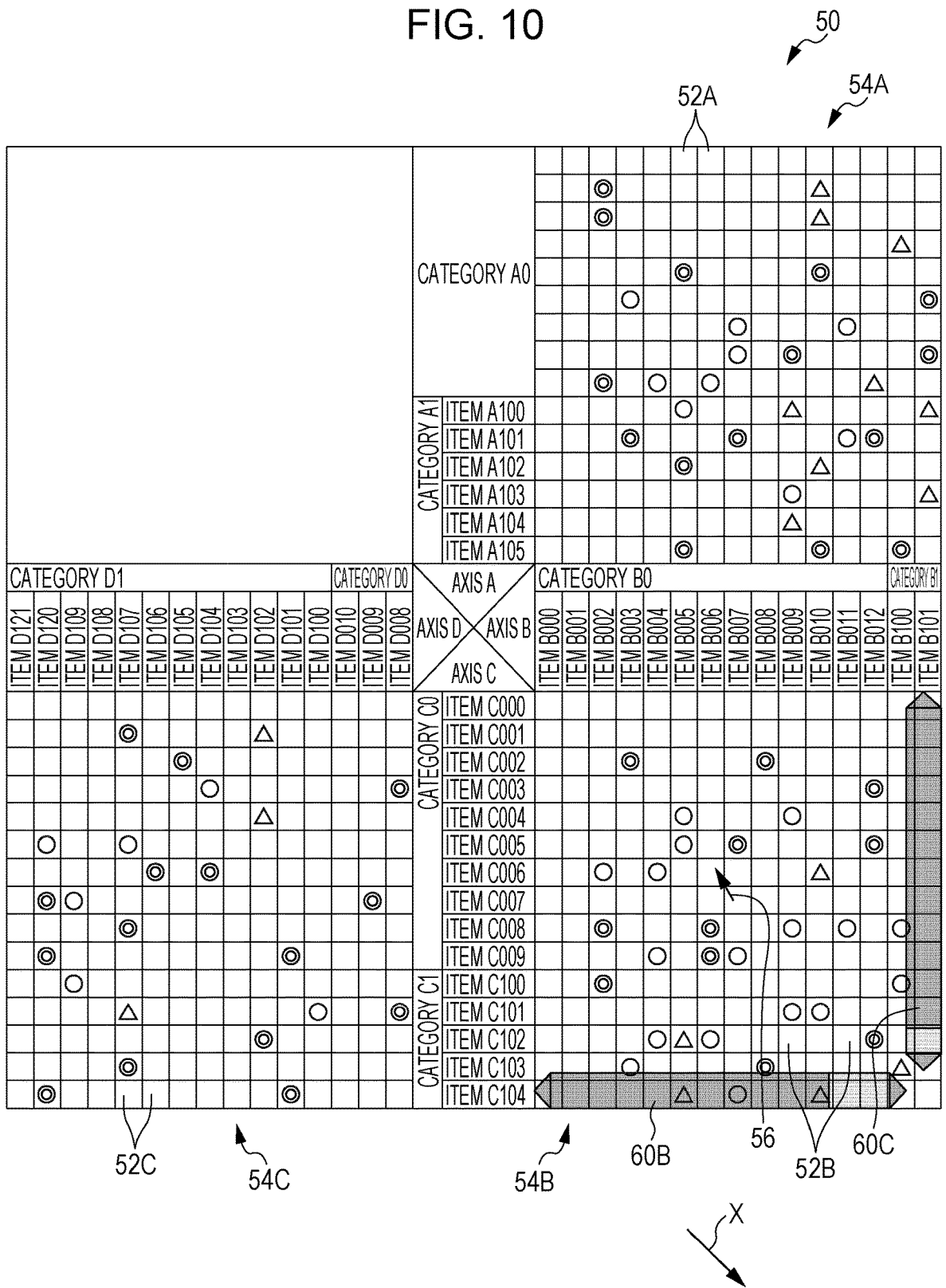
FIG. 10 illustrates an example of the QA table.

In step S122, control is performed such that only the designated category is displayed with items included in the category not displayed. For example, in the case where a double-click is performed with the cursor 56 moved to a category A0 in FIG. 10, only the category A0 is displayed with the items A001 to A009 not displayed.

In step S124, it is determined whether or not an operation to finish display of the QA table 50 is performed. In the case where an operation to finish display of the QA table 50 is performed, the routine is ended. In the case where an operation to finish display of the QA table 50 is not performed, on the other hand, the process proceeds to step S104 to repeat the processes described above.

Figure 11:
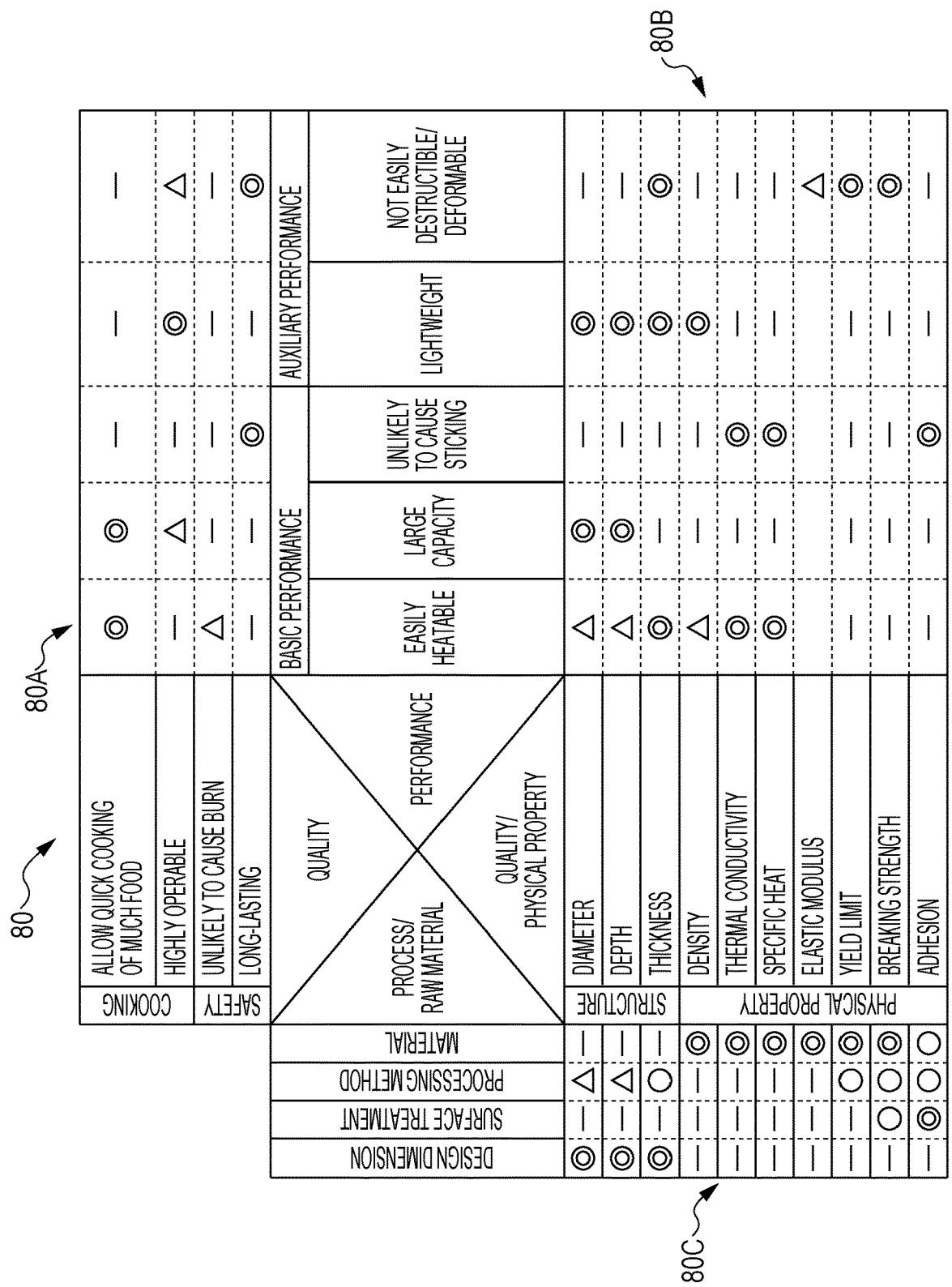
FIG. 11 illustrates a specific example of the QA table.

FIG. 11 illustrates a QA table 80 for a saucepan as a specific example of the QA table. As illustrated in FIG. 11, the QA table 80 includes three tables 80A to 80C. The QA table 80 uses four identifiers, namely, a "double circle" indicating VERY STRONG, a "circle" indicating STRONG, a "triangle" indicating WEAK, and a "blank field" indicating NONE.

In the QA table 80, the "quality" is set on an axis A, the "performance" is set on an axis B, the "quality/physical property" is set on an axis C, and the "process/raw material" is set on an axis D. The axis A has "cooking" and "safety" as categories, and "allow quick cooking" etc. as items. The axis B has "basic performance" and "auxiliary performance" as categories, and "easily heatable" etc. as items. The axis C has "structure" and "physical property" as categories, and "diameter" etc. as items. The axis D has no categories, and has "material" etc. as items.

In this case, it is seen that there is a great causal relationship between the quality "allow quick cooking of much food", which is an item on the axis A, and the performance "easily heatable", which is an item on the axis B, for example. It is also seen that there is a great causal relationship between the performance "easily heatable", which is an item on the axis B, and the "thermal conductivity", which is an item on the axis C. It is also seen that there is a great causal relationship between the "thermal conductivity", which is an item on the axis C, and the "material", which is an item on the axis D. Thus, it is seen that there is a great causal relationship between the quality "allow quick cooking of much food" and the "material".

While an exemplary embodiment has been described above, the technical scope of the present invention is not limited to the exemplary embodiment described above. A variety of modifications and alterations may be made to the exemplary embodiment described above without departing from the scope and spirit of the present invention. Such modified or altered forms also fall within the technical scope of the present invention.

The exemplary embodiment described above does not limit the invention defined by the claims, and all combinations of the characteristics described in relation to the exemplary embodiment are not necessary for the invention. The exemplary embodiment discussed earlier includes inventions at a variety of stages, and a variety of inventions are extracted in accordance with a combination of plural disclosed constituent elements. Even if some constituent elements are removed from all the constituent elements described in relation to the exemplary embodiment, a constitution with such constituent elements removed may be extracted as an invention as long as an effect is obtained.

For example, a QA table that includes four axes and three tables is described in relation to the present exemplary embodiment. However, the present invention may be applied to a multi-dimensional table that includes three axes and two tables.

As illustrated in FIG. 12, for example, a supplementary table 82A that displays supplementary information that is supplementary to the table 80A, a supplementary table 82B that displays supplementary information that is supplementary to the table 80B, and a supplementary table 82C that displays supplementary information that is supplementary to the table 80C may also be displayed.

In the exemplary embodiment described above, for example, the display control program is installed in advance in the HDD 24. However, the present invention is not limited thereto. For example, the display control program may be provided as being stored in a portable storage medium such as a compact disk read only memory (CD-ROM), or provided via a network.

In the exemplary embodiment described above, further, the display control process is implemented by a software configuration utilizing a computer by executing a program. However, the present invention is not limited thereto. For example, the display control process may be implemented by a hardware configuration or a combination of a hardware configuration and a software configuration.

Besides, the configuration (see FIG. 2) of the display control apparatus 10 described in relation to the above exemplary embodiment is exemplary, and it is to be understood that an unnecessary portion may be removed or a new portion may be added without departing from the scope and spirit of the present invention.

In addition, the flow (see FIG. 3) of a process of the display control program described in relation to the above exemplary embodiment is exemplary, and it is to be understood that an unnecessary step may be removed, a new step may be added, or the process order may be changed without departing from the scope and spirit of the present invention.

What is claimed is:

1. A display control apparatus configured with memory and a processor, the processor programmed to perform the following:

display a multi-dimensional table that includes three or more axes which extend in different directions and on each of which a plurality of items are disposed and a plurality of tables each including a plurality of cells that indicate a correlation between items disposed on two orthogonal axes of the three or more axes, each of the plurality of tables configured to be scrolled in two directions corresponding to the two orthogonal axes, in the event a scroll operation is performed on any first table selected from the plurality of tables, wherein a second table is adjacent to the first table in a first direction determined in advance, and a direction of the scroll operation is a second direction that is orthogonal to the first direction, the processor is programmed to cause only the first table and the second table to be scrolled in conjunction with each other together with an axis that extends along the direction of the scroll operation.

2. The display control apparatus according to claim 1, wherein, in a case where the direction of the scroll operation is the first direction, the processor is programmed to independently scroll the first table together with an axis that extends along the direction of the scroll operation.

3. The display control apparatus according to claim 1, wherein, in a case where the second table is not adjacent to the first table in the first direction, the processor is programmed to independently scroll the first table together with an axis that extends along the direction of the scroll operation.

4. The display control apparatus according to claim 1, wherein, in a case where the direction of the scroll operation corresponds to an oblique direction that intersects the first direction and the second direction, the the processor is programmed to scroll the first table in the oblique direction together with an axis that extends along the first direction and an axis that extends along the second direction.

5. The display control apparatus according to claim 4, wherein the processor is programmed to control scrolling such that a table that is adjacent to the first table with the axis which extends along the first direction interposed therebetween is scrolled in the first direction and a table that is adjacent to the first table with the axis which extends along the second direction interposed therebetween is scrolled in the second direction.

6. The display control apparatus according to claim 1, wherein, in a case where any of the plurality of items is selected, the processor is programmed to display a first input field that allows input of first information associated with the selected item.

7. The display control apparatus according to claim 6, wherein, in a case where the first information is input to the first input field, the processor is programmed to display in the selected item, a first identification mark indicating that the first information has been input.

8. The display control apparatus according to claim 7, wherein, in a case where an operation to select the first identification mark is performed, the processor is programmed to display the first information.

9. The display control apparatus according to claim 1, wherein, in a case where any of the plurality of cells is selected, the processor is programmed to display a second input field that allows input of second information associated with information input to the selected cell.

10. The display control apparatus according to claim 9, wherein, in a case where the second information is input to the second input field, the processor is programmed to display in the selected cell, a second identification mark indicating that the second information has been input.

11. The display control apparatus according to claim 10, wherein, in a case where an operation to select the second identification mark is performed, the processor is programmed to display the second information.

12. The display control apparatus according to claim 1, wherein the processor is programmed to display a scroll bar that is used to perform the scroll operation in a case where a cursor is disposed in a display range of the table, and does not display the scroll bar in a case where the cursor is disposed outside the display range of the table.

13. The display control apparatus according to claim 1, wherein the processor is programmed to display the three or more axes at fixed positions even in a case where the scroll operation is performed.

14. The display control apparatus according to claim 1, wherein a category that includes two or more items is disposed on the axes, and
in a case where an operation to display only the category is performed, the processor is programmed to display only the category with the items included in the category not displayed.

15. The display control apparatus according to claim 14, wherein, in a case where an operation determined in advance is performed on the category, the processor is programmed to display only the category with the items included in the category not displayed.

16. A display control apparatus configured with memory and a processor, the processor programmed to perform the following:
display a multi-dimensional table that includes three or more axes which extend in different directions and on each of which a plurality of items are disposed and a plurality of tables each including a plurality of cells that indicate a correlation between items disposed on two orthogonal axes of the three or more axes, each of the plurality of tables configured to be scrolled in two directions corresponding to the two orthogonal axes,
in the event a scroll operation is performed in a first axial direction on any selected first table from the plurality of tables, the processor is programmed to perform a scroll on only the first table and a second table which is adjacent to the first table with a first axis interposed therebetween, the scroll on the second table performed in the first axial direction in conjunction with the first table.

17. A non-transitory computer readable medium storing a display control program causing processor and memory to function as the control apparatus of claim 1.

* * * * *